United States Patent [19]

Hagiwara et al.

[11] 4,215,008

[45] Jul. 29, 1980

[54] RARE EARTH-CONTAINING ALLOYS AND METHOD FOR PURIFICATION OF HYDROGEN GAS THEREWITH

[75] Inventors: Zenzi Hagiwara, Kusatsu; Sigeo Matsui, Kobe; Susumu Sakaguchi, Yokohama; Yoshio Yamanaka, Takefu, all of Japan

[73] Assignees: Shin-Etsu Chemical Co. Ltd., Tokyo; Osaka Oxygen Industries Ltd., Osaka, both of Japan

[21] Appl. No.: 919,715

[22] Filed: Jun. 27, 1978

Related U.S. Application Data

[63] Continuation of Ser. No. 688,422, May 20, 1976, abandoned.

[30] Foreign Application Priority Data

May 26, 1975 [JP] Japan ................................. 50/62621
May 28, 1975 [JP] Japan ................................. 50/64674

[51] Int. Cl.² ............................................. B01D 15/08
[52] U.S. Cl. ................................... 252/184; 252/462; 34/15; 55/74; 55/16; 55/58; 55/62
[58] Field of Search ................... 252/184, 462; 55/74, 55/16, 58, 62; 75/176, 153, 152, 170, 171; 34/15

[56] References Cited

U.S. PATENT DOCUMENTS

| | | | |
|---|---|---|---|
| 3,315,479 | 4/1967 | Wiswall et al. | 34/15 |
| 3,375,676 | 4/1968 | Reilly et al. | 34/15 |
| 3,406,496 | 10/1968 | Betteridge et al. | 55/58 |
| 3,438,178 | 4/1969 | Betteridge et al. | 55/68 |
| 3,825,418 | 7/1974 | Reilly et al. | 75/170 |
| 3,883,346 | 5/1975 | Martin | 75/170 |
| 3,918,933 | 11/1975 | Martin | 55/16 |
| 3,922,872 | 12/1975 | Reilly et al. | 34/15 |

*Primary Examiner*—Brooks H. Hunt
*Attorney, Agent, or Firm*—Toren, McGeady and Stanger

[57] ABSTRACT

An efficient and economical method for the purification of hydrogen gas is proposed by use of an alloy of a rare earth metal with nickel and/or cobalt plus, optionally, iron, copper or chromium, utilizing the great selectivity of the alloy for the adsorption of hydrogen gas with very little adsorptivity for impurity gases commonly found in an impure hydrogen gas. The purification process is carried out by the pressurized adsorption of hydrogen on the alloy powder, followed by the recovery of high-purity hydrogen gas released from the alloy under reduced pressure or by heating. The alloy in the form of powder is preferably activated prior to use by repeated adsorption-desorption cycles of hydrogen on and from the alloy powder.

1 Claim, 10 Drawing Figures

RARE EARTH-CONTAINING ALLOYS AND METHOD FOR PURIFICATION OF HYDROGEN GAS THEREWITH

This is a continuation of application Ser. No. 688,422, filed May 20, 1976, now abandoned.

BACKGROUND OF THE INVENTION

This invention relates to a rare earth-containing alloy and a method for the purification of hydrogen gas with the alloy.

Hydrogen gas is a very important industrial material and is produced by several methods, such as, cracking of natural gas or petroleum, electrolysis of water, catalytic decomposition of ammonia and water gas reaction. It is usual that the hydrogen gas produced by the above methods contains various kinds of impurities including rare gases, such as, helium, argon, xenon and krypton, inorganic gases, such as, oxygen, nitrogen, carbon monoxide, carbon dioxide, sulfur dioxide, ammonia and water, and organic gases, especially hydrocarbon gases, such as, methane and ethane. Therefore, it is a usual practice that the hydrogen gas is subjected to a purification process in accordance with the use for which the gas is employed.

Several ways of purification of hydrogen gas are known. One example proposes to purify hydrogen gas by adsorption on an adsorbent, such as, zeolites, active charcoal, active alumina and silica gel at a low temperature of, say, liquid nitrogen. Another example proposes to purify hydrogen gas by a pressure cycle for the adsorption and desorption of the hydrogen gas on and from the same adsorbents as in the above example at room temperature. A further example proposes to purify hydrogen gas by the principle of diffusion through a membrane of a particular alloy, such as, palladium-silver and palladium-yttrium alloys. On operation, these methods are disadvantaged by a relatively high cost generally. In particular, the diffusion method has another problem in relation to the durability of the alloy membranes.

SUMMARY OF THE INVENTION

The present invention has been completed as a result of the extensive investigations by the inventors to establish an economical way for the purification of hydrogen gas. This invention is based on the discovery of a remarkably large selectivity in gas adsorption exhibited by an alloy composed of a rare earth metal and nickel and/or cobalt as the main components. The alloy can adsorb large amounts of hydrogen gas while the adsorptivity of the alloy for the impurity gases usually accompanying hydrogen gas as mentioned above is very low. The idea is that the utilization of the great selectivity of the alloy for hydrogen adsorption may lead to the possibility of a very effective process for the purification of hydrogen gas.

The composition of the alloy most effective for the purpose has been established by the experiments of the inventors. It is expressed by the formula $R(M_{1-x}^1 M_x^2)_z$ where R denotes one or a combination of rare earth metals, namely, metals of scandium, yttrium and the elements with the atomic numbers of 57 to 71, both inclusive, $M^1$ denotes nickel and/or cobalt, $M^2$ denotes an element or elements selected from the group consisting of iron, copper and chromium, x is 0 or a positive number not exceeding 0.5 and z is a positive number between 2 and 9, both inclusive.

The rare earth-containing alloy with the above composition has very high adsorptivity and selectivity for hydrogen adsorption, and the hydrogen gas adsorbed on the alloy can be desorbed with ease and recovered with a high efficiency.

The procedure for the purification or separation of hydrogen gas with the alloy of the present invention is as follows. A hydrogen-containing mixed gas is compressed in a vessel filled with particles or granules of the alloy until the partial pressure of hydrogen inside reaches 1 to 30 kg/cm$^2$G so that hydrogen in the mixed gas is adsorbed selectively by the alloy. Then the adsorbed hydrogen gas is brought to desorption by suction or heating of the vessel to be recovered in a purified state. The alloy particles or granules are preferably activated prior to use by first being heated in vacuum or in an atmosphere of hydrogen followed by the adsorption of hydrogen gas under a suitable pressure and then by the desorption of the adsorbed hydrogen gas.

DETAILED DESCRIPTION OF THE PREFERRED EMBODIMENTS

Figure 1:
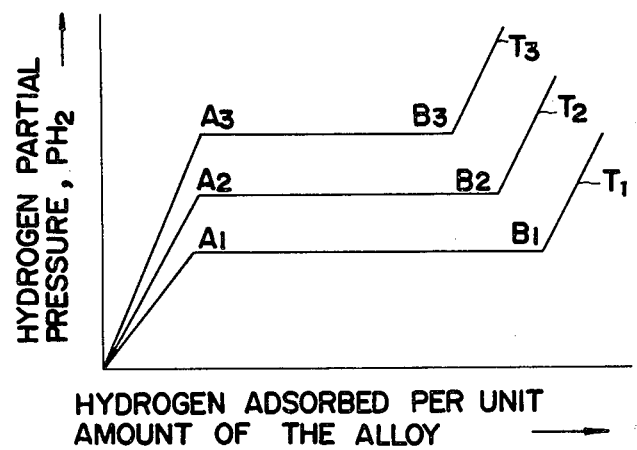
FIG. 1 is a shematic diagram of the adsorption isotherms at temperatures $T_1$, $T_2$ and $T_3$ taking the hydrogen partial pressure and the amount of the adsorbed hydrogen per unit weight of the alloy as the ordinate and the abscissa, respectively.

The rare earth-containing alloy of the present invention employed for the separation or purification of hydrogen gas has a composition expressed by the formula $R(M_{1-x}^1 M_x^2)_z$ where R, $M^1$, $M^2$, x and z have the meanings as defined above. The rare earth elements include scandium, yttrium and the elements with the atomic numbers from 57 to 71 both inclusive, namely, lanthanum, cerium, praseodymium, neodymium, samarium, europium, gadolinium, terbium, dysprosium, holmium, erbium, thulium, ytterbium and lutetium. It is of no necessity to employ the metal of a single pure rare earth element, but it is rather advantageous to employ a mixed rare earth metals which are less expensive. Although the lighter rare earth metals, e.g., lanthanum, cerium, neodymium and samarium, are not so expensive as the heavier rare earth metals, it is preferred to use a misch metal which is an alloy of these lighter rare earth metals and several others.

The metal denoted by $M^1$ is nickel or cobalt. They may be employed either singly or in combination. These two metals exhibit substantially the same effects with respect to their adsorptive properties for hydrogen gas.

The alloy of the present invention is basically a binary alloy of a rare earth metal as the first component and nickel and/or cobalt as the second component although it is optional that the alloy is a ternary alloy with the addition of a third metal $M^2$ selected from iron, copper and chromium, provided that the amount of the third metal is at most a half of the non-rare earth metals $M^1$ and $M^2$ in moles. The third metal is added for the purpose of decreasing the melting point of the alloy as well as of increasing the hydrogen adsorption of the alloy under lower pressure and temperature. When the amount of the third metal exceeds a half of the non-rare earth metals, the effectiveness of the alloy in hydrogen purification is unsatisfactory.

The value of z in the formula is the determining parameter for the mole ratio of the non-rare earth metals to the rare earth metal or metals. It should be in the range from 2 to 9, both inclusive, or preferably from 2.5 to 6, both inclusive. When the value of z is outside the above range, the resultant alloy has rather a low effectiveness for hydrogen purification.

The rare earth-containing alloy can be prepared by melting together weighed amounts of the individual metals in vacuum or in an atmosphere of inert gases, such as argon, followed by cooling to solidification. It is generally recommendable that the alloy should, prior to use, be pulverized by a suitable means and made to have particle size distribution controlled by passing through screens. The preferred range of the particle size distribution is from 20 to 325 mesh (Tyler standard), because coarser particle sizes have a disadvantage of lower velocity of adsorption, while finer particle sizes lead to the danger of increased surface oxidation of the alloy powder.

The rare earth-containing alloys of the present invention exhibit an excellent selectivity for hydrogen adsorption at certain temperature and pressure. The schematic adsorption isotherms shown in FIG. 1 to follow are for the adsorption of hydrogen gas on the rare earth-containing alloys, and each of them has a definite plateau at a certain level of the hydrogen partial pressure. Assume that the temperature is constant at $T_1$, then the amount of the adsorbed hydrogen gas on the unit amount of the alloy increases gradually as the hydrogen partial pressure increases up to the point $A_1$, after which the amount of the adsorbed hydrogen gas rapidly increases with minor increase in the hydrogen partial pressure from $A_1$ to $B_1$ showing the plateau in the adsorption isotherm. When the hydrogen partial pressure further increases beyond the plateau region $A_1$ to $B_1$, the increase in the amount of the adsorbed hydrogen becomes relatively small in relation to the increase in the hydrogen partial pressure.

As the temperature is raised from $T_1$ to $T_2$ and from $T_2$ to $T_3$, the plateau in the adsorption isotherm shifts upwardly to the direction of higher pressure as shown in FIG. 1 in paralled with the decrease in the length of the plateau, namely $A_1B_1 > A_2B_2 > A_3B_3$.

In an example, a powdered alloy of lanthanum and nickel of the composition $LaNi_5$ shows a plateau in the adsorption isotherm for the hydrogen partial pressure of about 3.5 kg/cm$^2$G at 20° C. and the maximum amount of the adsorbed hydrogen gas in the plateau region is as large as 170 ml (N.T.P.) per g of the alloy powder. If the hydrogen adsorbed here is in the form of a hydride, the composition of the lanthanum-nickel alloy with adsorbed hydrogen corresponds to $LaNi_5H_{6.5}$.

Table I below gives similar values of the plateau pressure and the maximum amount of the adsorbed hydrogen in the plateau region per g of various kinds of rare earth-containing alloys along with the formulas of the hydrides formed. Thus, the rare earth-containing alloys of the present invention have a very high adsorptivity for hydrogen gas.

Table I

| Composition of rare earth-containing alloy | Plateau pressure, atmosphere (Temperature, °C.) | Hydrogen adsorption, ml(N.T.P.)/ g of alloy | Composition of hydride |
|---|---|---|---|
| $SmCo_5$ | 4.6 (22) | 73 | $SmCo_5H_{2.3}$ |
| $CeNi_5$ (Misch metal)- | 12 (20) | — | — |
| $Ni_{3.8}Cr_{1.2}$ | — (20) | about 120 | — |
| $LaNi_{4.2}Fe_{0.2}$ | 4 (26) | about 120 | — |
| $LaNi_{3.6}Cr_{0.9}$ | 1.5 (0) | about 110 | — |
| $(La_{0.75}Y_{0.25})$-$Ni_{5.0}$ | 8.1 (22) | 176 | $(La_{0.75}Y_{0.25})$-$Ni_{5.0}H_{6.7}$ |

Figure 2:
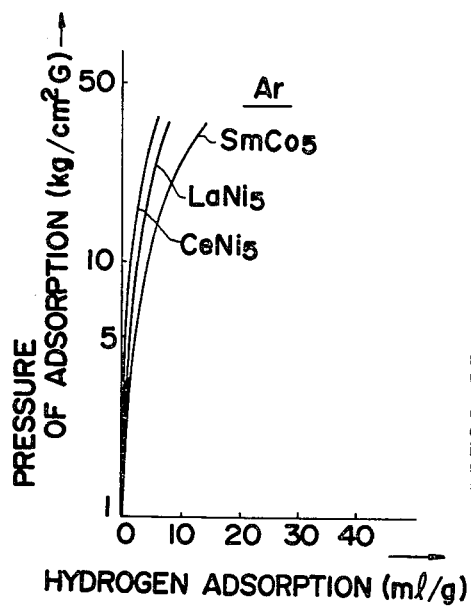
FIG. 2 is a schematic diagram showing the adsorption isotherms of argon at 25° C. on three kinds of rare earth-containing alloys, SmCo$_5$, LaNi$_5$ and CeNi$_5$.
Figure 3:
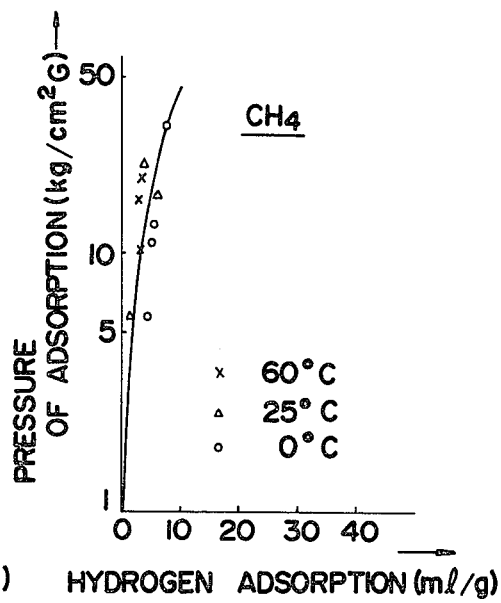
FIG. 3 is a schematic diagram showing the adsorption isotherms of methane on SmCo$_5$ at 0° C., 25° C. and 60° C.
Figure 4:
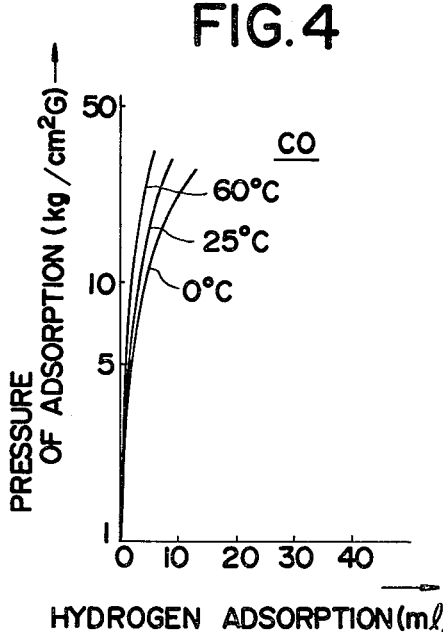
FIG. 4 is a schematic diagram showing the adsorption isotherms of carbon monoxide on SmCo$_5$ at 0° C., 25° C. and 60° C.
Figure 5:
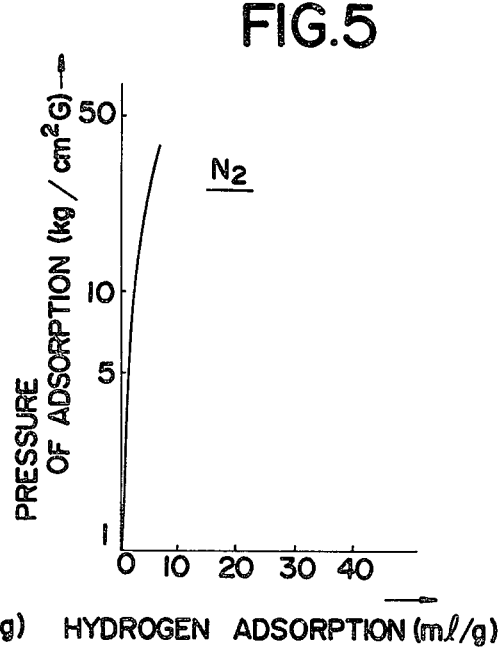
FIG. 5 is a schematic diagram showing the adsorption isotherm of nitrogen on LaNi$_5$ at 25° C.
Figure 6:
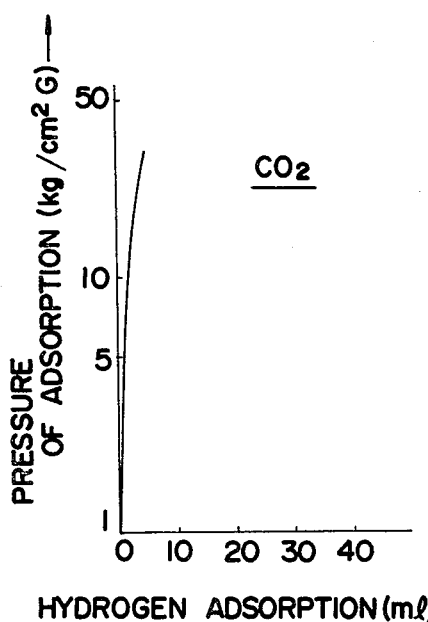
FIG. 6 is a schematic diagram showing the adsorption isotherm of carbon dioxide on LaNi$_5$ at 25° C.
Figure 7:
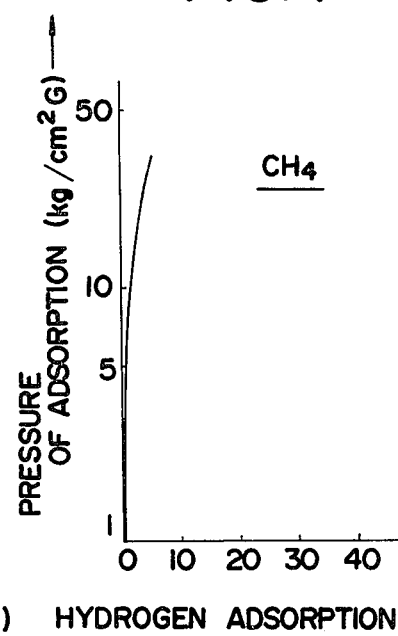
FIG. 7 is a schematic diagram showing the adsorption isotherm of methane on LaNi$_5$ at 25° C.
Figure 8:
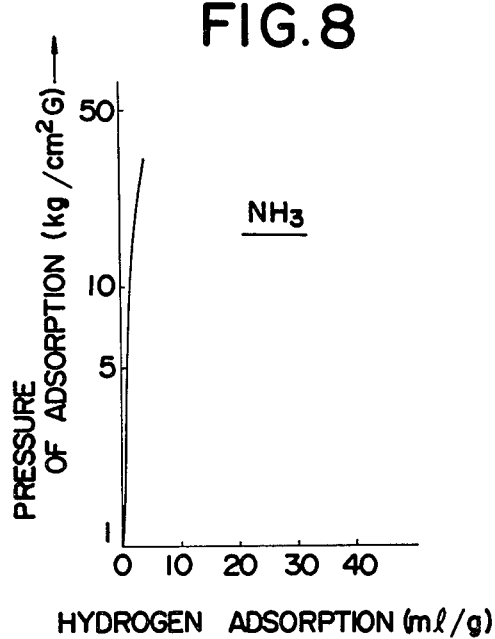
FIG. 8 is a schematic diagram showing the adsorption isotherm of ammonia on LaNi$_5$ at 25° C.

On the other hand, the alloys have a very low adsorptivity for the impurity gases as mentioned before usually found in impure hydrogen gases. For example, the adsorption isotherms of argon as a typical inert gas on the rare earth-containing alloys $SmCo_5$, $LaNi_5$ and $CeNi_5$ are as shown in FIG. 2. FIGS. 3 and 4 show the adsorption isotherms of methane and carbon monoxide, respectively, on $SmCo_5$ alloy powder at 0° C., 25° C. or 60° C. FIGS. 5 to 8 show the adsorption isotherms of nitrogen, carbon dioxide, methane and ammonia, respectively, on $LaNi_5$ alloy powder at 25° C. Similarly, the rare earth-containing alloys listed in Table I also adsorb hydrogen gas selectively but show a very little adsorptivity for argon, nitrogen, carbon monoxide, carbon dioxide and hydrocarbons such as, methane and ethane.

Figure 9:
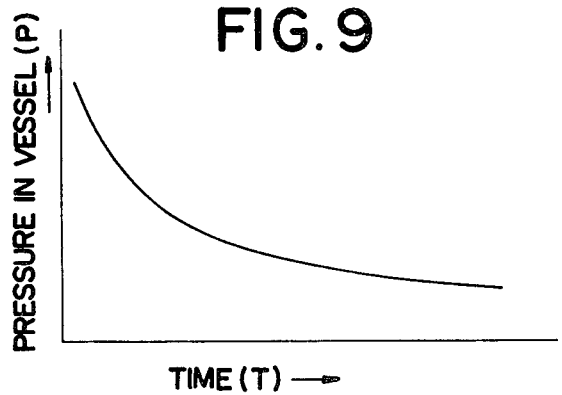
FIG. 9 is a schematic diagram for the pressure drop inside the vessel as a function of time in the process of hydrogen release in accordance with the method of the present invention.

These rare earth-containing alloys with hydrogen gas adsorbed on them gradually release the hydrogen when they are placed under atmospheric or subatmospheric pressure which is lower than the pressure at which the adsorption of the hydrogen has been effected. For example, hydrogen gas is compressed in a vessel filled with $LaNi_5$ alloy powder to a pressure of, say, 3 kg/cm$^2$G at 23° C. and the introduction of hydrogen gas is stopped when the adsorption equilibrium has been established in the system. Next, the valve installed at an end of the vessel is opened slightly to have a leakage of the hydrogen gas through it and the decrease of the pressure inside the vessel is recorded as a function of time as given in FIG. 9. When a higher velocity is desired for the desorption of hydrogen, the alloy powder in the vessel is heated or placed under reduced pressure, thus facilitating the efficient recovery of the hydrogen gas.

In the foregoing, the principle has been described for the separation or purification of hydrogen gas by use of the rare earth-containing alloys of the present invention, according to which hydrogen gas containing impurities is brought into contact with the alloy under pressure to be selectively adsorbed on the alloy, followed by desorption by heating or pressure decrease.

Figure 10:
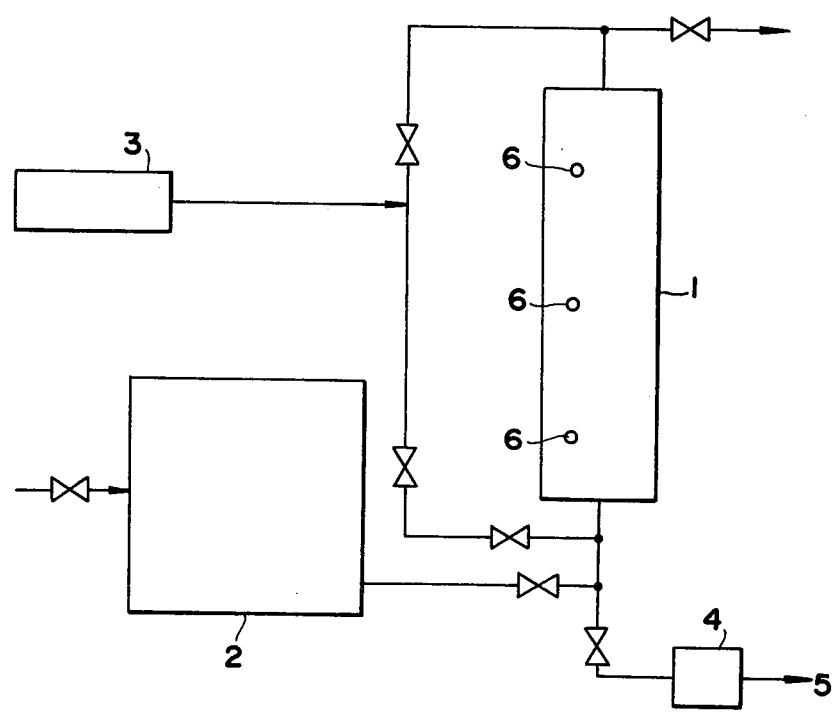
FIG. 10 is a block diagram of the hydrogen purification system in accordance with the method of the present invention.

Now, the procedures for the purification process will be further illustrated in the following with reference to the schematic drawing shown in FIG. 10.

The purifier vessel or column 1 equipped with thermocouples 6 and a heater (not shown) is filled with 20 to 300 mesh powder of a rare earth-containing alloy of the invention to form a bed. The impure hydrogen gas held in the gas reservoir 2 is introduced into the purifier column 1 at the bottom, so that the pressure inside the purifier column 1 reaches 1 to 30 kg/cm$^2$G where the pressure is maintained to establish the adsorption equilibrium while, if necessary, continuing the introduction of the impure hydrogen gas at the bottom along with the partial purge of the gas from the outlet on the top of the purifier column 1. It is advantageous that the purifier column 1 is evacuated to as high vacuum as possible prior to the introduction of the impure hydrogen gas. The temperature at which the impure hydrogen gas is introduced into the purifier column 1 may be in the range from 5° to 80° C., or preferably room temperature from the standpoint of convenience.

When an equilibrium has been established by the selective adsorption of hydrogen gas on the rare earth-containing alloy from the impure hydrogen gas compressed into the purifier column 1, the introduction of the impure hydrogen gas is stopped and the gas enriched with the impurities in the column is purged out by the introduction of a high purity hydrogen gas from a gas cylinder 3 maintaining the pressure to such an extent that substantially no impurity gases remain in the gaseous phase in the purifier column 1. Next, the hydrogen gas adsorbed on the alloy becomes desorbed and recovered in a high purity through a piping 5 by evacuating the purifier column with a vacuum pump 4 or heating the column from outside. It is of course possible to enhance the efficiency of the hydrogen gas recovery by a simultaneous evacuation and heating.

The rare earth-containing alloys of the present invention are also useful when the removal of hydrogen from a mixed gas containing a relatively samll amount of hydrogen gas is desired.

It is advantageous in the practice of the above-described procedure for hydrogen purification to activate the rare earth-containing alloy prior to use. This activation is performed by the procedure of either (a) or (b) below.

(a) The rare earth-containing alloy is heated in vacuum at a temperature between 40° and 400° C. or, preferably, 100° and 250° C. and then subjected to a repetition of several cycles of adsorption of hydrogen under pressure and desorption of the thus adsorbed hydrogen by heating or reducing the pressure. (b) The rare earth-containing alloy is heated in an atmosphere of hydrogen gas at a temperature between 70° and 300° C. or, preferably, 90° and 250° C. and then subjected to a repetition of several cycles of adsorption of hydrogen gas under pressure and desorption of the thus adsorbed hydrogen by heating or reducing the pressure.

In the above procedure (a) or (b) for the activation of the alloy, the time for the first heating is from a half to 3 hours or, preferably, from 1 to 2 hours and the pressure in the adsorption of hydrogen gas is in the range from about 10 to 50 kg/cm$^2$G.

The following examples are given to illustrate the invention, but not to limit the scope of the invention.

EXAMPLE 1

A lanthanum-nickel alloy with the composition LaNi$_5$ was pulverized into a powder with 200 to 300 mesh particle size. The powder was heated at 150°±5° C. in a vacuum of 10$^{-3}$ mmHg for 2 hours and then activated by 6 cycles of repeated adsorption-desorption of hydrogen gas, wherein the adsorption was performed in the presence of 20 kg/cm$^2$G of high-purity hydrogen and the desorption was performed by reducing the pressure.

The adsorption equilibrium of hydrogen gas on the thus activated alloy powder was established within a very short period with good reproducibility.

A stainless steel purifier column of 15 mm in diameter and 265 mm in height was filled with 125 g of the activated LaNi$_5$ alloy powder. Impure hydrogen gas composed of 98.89% of hydrogen and 1.11% of nitrogen was introduced at 25° C. into the purifier column after evacuation to 20 mmHg from the bottom of the column to a pressure of 4 kg/cm$^2$G where the pressure was kept constant for a while at 25° C. When an adsorption equilibrium was established, the introduction of impure hydrogen gas was stopped and then about 6 liters of high-purity hydrogen gas was introduced into the column at the top of the column in parallel with the discharge of the gas from the bottom to sweep the inside of the column to be free of impurity gases.

The hydrogen gas released from the alloy by heating the column at 75° C. had a purity higher than 99.99% as determined by mass spectrometry and amounted to 19.7 liters at N.T.P.

EXAMPLE 2

About 150 g of an alloy powder of the composition LaNi$_{4.2}$Fe$_{0.2}$ having a particle size distribution of 100 to 250 mesh was packed in a fused quartz tube and heated at 170°±5° C. for one and a half hour under a flow of a high-purity hydrogen gas at a rate of 5 liters/minute. After cooling the alloy powder was activated by pressurizing the tube with the high-purity hydrogen gas to a pressure of 43 kg/cm$^2$G to effect the adsorption of the hydrogen gas onto the alloy powder followed by desorption under reduced pressure, the adsorption-desorption cycle being repeated 5 times.

The same purifier column as employed in Example 1 was filled with the thus activated alloy powder, and the column was evacuated to a pressure of 25 mmHg. Then an impure hydrogen gas composed of 96.5% of hydrogen, 1.1% of nitrogen and 2.4% of argon was introduced at 25° C. into the column at the bottom to a final pressure of 4.5 kg/cm$^2$G where the pressure was kept constant for a while to establish the adsorption equilibrium. After the establishment of the adsorption equilibrium, the introduction of the impure hydrogen gas was stopped and the cleaning of the interior of the column was undertaken similarly as in Example 1 by the simultaneous introduction of 6.5 liters of high-purity hydrogen gas at the column top and the discharge of the gas from the bottom.

The hydrogen gas released from the alloy by heating the column at 80° C. had a purity higher than 99.99% and the volume of the hydrogen gas amounted to 17.9 liters at N.T.P.

EXAMPLE 3

An alloy powder of the composition SmCo$_{5.0}$ having a particle size distribution of 100 to 325 mesh was activated in the same manner as in Example 1. About 130 g of the activated alloy powder was packed in the same purifier column as employed in Example 1 and, after evacuation of the column to a pressure of 25 mmHg, an impure hydrogen gas composed of 96.5% hydrogen and 3.5% of methane was introduced to the column at 26° C. at its top to a final pressure of 29 kg/cm$^2$G. After establishment of the adsorption equilibrium of hydrogen gas on the alloy powder, the introduction of the impure hydrogen gas was stopped and the interior of the column was swept by simultaneously introducing 6.5 liters of a high-purity hydrogen gas at the column top and the discharge of the gas from the bottom.

The hydrogen gas released from the alloy powder by heating the column at 80° C. had a purity higher than 99.99% and the volume of the hydrogen gas amounted to 8.2 liters at N.T.P.

EXAMPLE 4

An alloy powder of the composition LaNi$_{3.6}$Cr$_{0.9}$ having a particle size distribution of 250 to 300 mesh was activated in the same manner as in Example 1. About 134 g of the activated alloy powder was packed in the same purifier column as employed in Example 1. After evacuation of the column to a pressure of 25 mmHg, an impure hydrogen gas composed of 95.1% hydrogen, 2.2% of nitrogen, 0.5% of carbon dioxide and 2.2% of argon was introduced into the column at 26° C. to a final pressure of 6.1 kg/cm$^2$G, where the pressure was kept for a while. After the establishment of the adsorption equilibrium of hydrogen on the alloy powder, the introduction of the impure hydrogen was stopped and the interior of the column was swept by simultaneously introducing 7.1 liters of a high-purity hydrogen gas at the column top and the discharge of the gas from the bottom.

The hydrogen gas released from the alloy powder by heating the column at 73° C. had a purity higher than 99.99% and the volume of the hydrogen gas amounted to 14.0 liters at N.T.P.

EXAMPLE 5

An alloy powder of the composition (La$_{0.75}$Y$_{0.25}$)Ni$_{5.0}$ having a particle size distribution of 80 to 250 mesh was activated in the same manner as in Example 1, and about 110 g of the activated alloy powder was packed in the same purifier column as employed in Example 1. After the evacuation of the column to a pressure of 25 mmHg, an impure hydrogen gas composed of 95.1% of hydrogen, 1.1% of nitrogen, 2.7% of carbon dioxide and 1.1% of argon was introduced into the column at 29° C. at the bottom of the column to a final pressure of 12 kg/cm$^2$G, where the pressure was kept for a while. After the establishment of the adsorption equilibrium of hydrogen on the alloy powder, the introduction of the impure hydrogen was stopped and the interior of the column was swept in the same fashion as in Example 4.

The hydrogen gas released from the alloy powder by heating the column had a purity higher than 99.99% and the volume of the recovered hydrogen gas amounted to 17.2 liters at N.T.P.

EXAMPLE 6

About 350 of a LaNi$_5$ alloy powder with a particle size finer than 325 mesh packed in a stainless steel purifier column 30 mm in inner diameter and 400 mm in height was activated in the same manner as in Example 1. After the evacuation of the column to a pressure of 10 mmHg, about 5.33 liters of impure hydrogen gas composed of 97% of hydrogen and 3% of carbon monoxide was introduced into the column at the bottom at about 22° C. and the pressure inside the column reached finally around 8 kg/cm$^2$G. Then about 4.89 liters of a high purity hydrogen gas with a purity higher than 99.99% was introduced into the column at the top in parallel with the discharge of the gas from the bottom of the column to have the inside of the column swept.

When the column was then heated at 80° C., the hydrogen adsorbed on the alloy powder in the column became desorbed and recovered out of the column. The volume of the portion of the thus recovered hydrogen gas with a purity higher than 99.99% mounted to 3.99 liters at N.T.P.

EXAMPLE 7

About 150 g of a lanthanum - nickel - copper alloy powder with the composition LaNi$_{4.4}$Cu$_{0.6}$, activated in the same manner as in Example 1, was packed in a stainless steel purifier column with an inner diameter of 15 mm. After evacuation of the column to a pressure of 25 mmHg, an impure hydrogen gas composed of 98.89% of hydrogen and 1.11% of nitrogen was introduced into the column at the bottom at about 23° C. and the pressure inside the column finally reached 14 kg/cm$^2$G where the pressure was maintained for a while in order to establish the adsorption equilibrium.

Then about 7 liters of a high-purity hydrogen gas was introduced into the column at the top in parallel with the discharge of the gas from the bottom of the column to have the inside of the column swept.

When the column was then heated at 80° to 90° C. the hydrogen gas adsorbed on the alloy powder in the column became desorbed and discharged out of the column. The volume of the thus recovered hydrogen gas, with a purity higher than 99.99%, amounted to 23.4 liters at N.T.P.

It was noted in this experiment that the introduction of copper in the composition of the alloy had an effect to increase the plateau pressure markedly. For example, the plateau pressure of the LaNi$_{4.4}$Cu$_{0.6}$ alloy used in this example was about 10 atmospheres at 20° C. while the corresponding value for LaNi$_5$ alloy was only 3.5 atmospheres.

EXAMPLE 8

Granules of a lanthanum-nickel-chromium alloy with the composition LaNi$_{2.1}$Cr$_{0.63}$ were activated by being subjected to heating at 250° C. for 2 hours in a vacumn of 10$^{-3}$ mmHg followed by 8 cycles of adsorption-desorption of hydrogen gas, each consisting of a step of adsorption by contacting with a high-purity hydrogen gas under a pressure of 25 kg/cm$^2$G and a step of desorption by evacuation.

A stainless steel purifier column with an inner dismeter 15 mm and height 265 mm, filled with about 100 g of the thus activated alloy granules, was evacuated to a pressure of 15 mmHg followed by the introduction of an impure hydrogen gas composed of 98.89% of hydrogen and 1.11% of nitrogen to a final pressure of about 6 kg/cm$^2$G inside the column, where the pressure was maintained for a while.

Then the impure gas in the column was purged by sweeping with a high-purity hydrogen gas. When the column was heated at 70° to 75° C., the hydrogen gas adsorbed in the alloy became desorbed and discharged out of the column. The volume of the thus recovered hydrogen gas, with a purity higher than 99.99%, amounted to 10.8 liters at N.T.P.

What is claimed is:

1. A method for purifying impure hydrogen gas comprising (a) introducing a powder composed of an alloy with the composition expressed by the formula $R(M^1_{1-x}M^2_x)_z$ where R is a rare earth metal, $M^1$ is a metal selected from the group consisting of nickel and cobalt, $M^2$ is a metal selected from the group consisting of iron, copper and chromium, x is 0 or a positive number not exceeding 0.5 and z is a positive number from 2 to 9, both inclusive, said powder having a particle size distribution ranging from 20 to 325 mesh by Tyler standard;

(b) heating the alloy powder at a temperature from 100° to 250° C. in a vacuum or at a temperature from 90° to 250° C. in an atmosphere of hydrogen gas;

(c) introducing hydrogen gas into the vessel containing the alloy powder to a pressure from 10 to 50 kg/cm$^2$G;

(d) evacuating or heating the vessel;

(e) introducing a quantity of impure hydrogen into the vessel to a hydrogen partial pressure of from 1 to 30 kg/cm$^2$G;

(f) purging the vessel of the impure hydrogen gas by means of a high purity hydrogen gas; and (g) evacuating or heating the vessel so that hydrogen absorbed in the alloy is released and recovered as purified hydrogen gas.

* * * * *